United States Patent
Haghighat et al.

(10) Patent No.: US 9,326,190 B2
(45) Date of Patent: Apr. 26, 2016

(54) METHOD AND APPARATUS FOR FEEDBACK OVERHEAD REDUCTION IN WIRELESS COMMUNICATIONS

(71) Applicant: InterDigital Technology Corporation, Wilmington, DE (US)

(72) Inventors: Afshin Haghighat, Ile-Bizard (CA); Robert L. Olesen, Huntington, NY (US); Guodong Zhang, Syosset, NY (US); Zinan Lin, Basking Ridge, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 92 days.

(21) Appl. No.: 14/324,752

(22) Filed: Jul. 7, 2014

(65) Prior Publication Data

US 2014/0321307 A1 Oct. 30, 2014

Related U.S. Application Data

(63) Continuation of application No. 12/049,220, filed on Mar. 14, 2008, now Pat. No. 8,918,061.

(60) Provisional application No. 60/942,554, filed on Jun. 7, 2007, provisional application No. 60/914,397, filed on Apr. 27, 2007, provisional application No. 60/895,079, filed on Mar. 15, 2007.

(51) Int. Cl.
*H04W 72/04* (2009.01)
*H04L 27/26* (2006.01)
*H04W 28/06* (2009.01)
(Continued)

(52) U.S. Cl.
CPC ............. *H04W 28/06* (2013.01); *H04L 1/0029* (2013.01); *H04W 24/10* (2013.01); *H04L 27/2601* (2013.01); *H04W 72/0413* (2013.01)

(58) Field of Classification Search
CPC . H04W 28/06; H04W 72/0413; H04W 24/10; H04L 1/0029; H04L 27/2601
USPC ................................ 370/252, 329; 455/67.11
See application file for complete search history.

(56) References Cited

U.S. PATENT DOCUMENTS

| 6,574,211 B2 | 6/2003 | Padovani et al. |
| 7,933,287 B2 | 4/2011 | Toda et al. |
| 8,099,119 B2 | 1/2012 | Wu et al. |

(Continued)

FOREIGN PATENT DOCUMENTS

| CA | 2618616 | 2/2007 |
| EP | 1509016 | 2/2005 |

(Continued)

OTHER PUBLICATIONS

"3rd Generation Partnership Project; Technical Specification Group Radio Access Network; Evolved Universal Terrestrial Radio Access (E-UTRA); Physical Layer Procedures (Release 8)", 3GPP TS 36.213 V8.1.0, Nov. 2007, 17 pages.

(Continued)

*Primary Examiner* — Afsar M Qureshi
(74) *Attorney, Agent, or Firm* — Theodore Naccarella (57) ABSTRACT

A method and apparatus for reducing feedback transmission overhead in wireless communications. Averaging, compression, or both are used to reduce a number of bits needed for transmission of channel quality information.

10 Claims, 5 Drawing Sheets

(51) Int. Cl.
*H04L 1/00* (2006.01)
*H04W 24/10* (2009.01)

(56) References Cited

U.S. PATENT DOCUMENTS

| | | | |
|---|---|---|---|
| 8,140,944 B2 | 3/2012 | Chen et al. | |
| 8,150,435 B2 | 4/2012 | Luschi et al. | |
| 8,918,061 B2* | 12/2014 | Haghighat | H04L 1/0029 370/328 |
| 2003/0169681 A1 | 9/2003 | Li et al. | |
| 2005/0003782 A1 | 1/2005 | Wintzell | |
| 2005/0136919 A1* | 6/2005 | Park | H04W 28/065 455/432.3 |
| 2005/0176436 A1 | 8/2005 | Mantravadi et al. | |
| 2006/0165188 A1 | 7/2006 | Wunder et al. | |
| 2006/0274712 A1 | 12/2006 | Malladi et al. | |
| 2007/0026808 A1 | 2/2007 | Love et al. | |
| 2007/0064669 A1* | 3/2007 | Classon | H04L 1/1822 370/347 |
| 2007/0098106 A1 | 5/2007 | Khojastepour | |
| 2007/0140102 A1 | 6/2007 | Oh et al. | |
| 2008/0013610 A1* | 1/2008 | Varadarajan | H04B 7/0417 375/221 |
| 2008/0049712 A1 | 2/2008 | Terabe et al. | |
| 2008/0056414 A1 | 3/2008 | Kim | |
| 2008/0080469 A1 | 4/2008 | Kolding et al. | |
| 2008/0112500 A1 | 5/2008 | Pan et al. | |
| 2009/0262653 A1 | 10/2009 | Toda et al. | |

FOREIGN PATENT DOCUMENTS

| | | |
|---|---|---|
| EP | 1750406 | 2/2007 |
| GB | 2415870 | 1/2006 |
| JP | 2004-23716 | 1/2004 |
| JP | 2008-547276 | 12/2008 |
| WO | WO-2004/004173 | 1/2004 |
| WO | WO-2005/036917 A1 | 4/2005 |
| WO | WO-2006/105005 | 10/2006 |
| WO | WO-2006/105308 | 10/2006 |
| WO | WO-2006/107835 A1 | 10/2006 |
| WO | WO-2006/110259 A1 | 10/2006 |
| WO | WO-2006/130541 | 12/2006 |
| WO | WO 2006/138555 | 12/2006 |
| WO | WO-2007/020995 | 2/2007 |

OTHER PUBLICATIONS

"3rd Generation Partnership Project; Technical Specification Group Radio Access Network; Physical Layer Procedures (Release 8)", 3GPP TS 36.213 V0.2.1, Oct. 2006, 13 pages.
"Huawei, Overhead Reduction of Best-M Based CQI Reporting", 3GPP TSG RAN WG1 RAN1 Meeting 47, Riga, Latvia, R1-063086, Originally cited in U.S. IDS Mar. 28, 2008, Nov. 6-10, 2006, 4 pages.
"InterDigital, Haar-Based Compression for CQI Feedback", 3GPP TSG RAN WG1 Meeting 48bis, St. Julians, Malta, R1-071466, Mar. 26-30, 2007, 7 pages.
"Korean Office Action", Korean Application No. 10-2009-7022176, Jun. 19, 2014, 4 pages.
"Korean Office Action (English Translation)", Korean Patent Application No. 10-2009-7022176, Jun. 19, 2014, 4 pages.
"LG Electronics, Further Analysis on DCT Based CQI Reporting Scheme", 3GPP TSG RAN WG1 46bis, Seoul, Republic of Korea, R1-062575, Oct. 9-13, 2006, 14 pages.
"Mexican Office Action", Mexican Application No. 2009/009889, Feb. 14, 2013, 2 Pages.
"Mexican Office Action", Mexican Application No. 2009-009889, Jan. 18, 2013, 2 pages.
"Mexican Office Action", Mexican Application No. 2009-009889, Nov. 23, 2011, 2 pages.
"Mexican Office Action (English Translation)", Mexican Application No. MX/a/2009/009889, Jan. 18, 2013, 3 pages.
"Mexican Office Action (Translation)", Mexican Application No. 2009/009889, Feb. 14, 2013, 3 Pages.
"Mexican Office Action (Unofficial Translation)", Mexican Application No. 2009/009889, Nov. 23, 2011, 1 page.
"Official Notice of Final Decision of Rejection", Japanese Patent Application No. 2009-553632, Jul. 27, 2012, 2 pages.
"Official Notice of Final Decision of Rejection (Translation)", Japanese Patent Application No. 2009-553632, Jul. 27, 2012, 3 pages.
"Official Notice of Rejection", Japanese Patent Application No. 2009-553632, Nov. 25, 2011, 3 pages.
"Official Notice of Rejection (Translation)", Japanese Patent Application No. 2009-553632, Nov. 25, 2011, 3 pages.
"Panasonic, Evaluation and Error Statistics for CQI Reporting Schemes", 3GPP TSG-RAN WG1 Meeting #47, Riga, Latvia, R1-063184, Nov. 6-10, 2006, 13 pages.
"United States Office Action", U.S. Appl. No. 12/049,220, Nov. 5, 2013, 11 pages.
Han, Zhong-Hai, et al., "Opportunistic Scheduling with Partial Channel Information in OFDMA/FDD Systems", Vehicular Technology Conference, 2004. VTC2004-Fall. 2004 IEEE 60th, vol. 1, no., pp. 511-514 vol. 1, Sep. 26-29, 2004, 4 pages.
Motorola, "CQI Feedback for EUTRA", 3GPP TSG RAN1 #47bis, R1-070049, Sorrento, Italy, Jan. 15-19, 2007, 7 pages.
NTT DoCoMo, et al., "Downlink MIMO Scheme in E-UTRA", 3GPP TSG RAN WG1 Meeting #46, R1-062105, Tallinn, Estonia, Aug. 28-Sep. 1, 2006, 11 pages.
NTT DoCoMo, "Physical Channels and Multiplexing in Evolved UTRA Downlink", 3GPP Tdoc R1-050590, 3GPP TSG RAN WG1 Ad Hoc on LTE, Sophia Antipolis, France, Jun. 20-21, 2005, 24 pages.
"Singapore Notice of Allowance", Singapore Patent Application No. 10201500997P, Sep. 8, 2015, 6 pages.
"Official Notice of Rejection", Japanese Application No. 2014-094730, Mar. 3, 2015, 2 pages.
"Official Notice of Rejection (English Translation)", Japanese Application No. 2014-094730, Mar. 3, 2015, 2 pages.

* cited by examiner

METHOD AND APPARATUS FOR FEEDBACK OVERHEAD REDUCTION IN WIRELESS COMMUNICATIONS

CROSS REFERENCE TO RELATED APPLICATIONS

This application is a Continuation of U.S. Non-Provisional application Ser. No. 12/049,220, filed Mar. 14, 2008, which claims the benefit of U.S. Provisional Application Nos. 60/895,079 filed Mar. 15, 2007, 60/914,397 filed Apr. 27, 2007, and 60/942,554 filed Jun. 7, 2007, all of which are incorporated by reference as if fully set forth.

FIELD OF INVENTION

This application is related to wireless communications.

BACKGROUND

Minimizing signaling overhead is desirable in wireless communications. This applies in particular to feedback transmissions and, in particular to feedback of channel quality, as measured by, for example, a signal-to-noise ratio or other channel quality index. A mobile unit, for example, may determine the quality of one or more channels and transmit this information to a base station, enabling the base station to select a set of best channels for communication at a given time.

In previously proposed schemes called "best-M" schemes, overhead for quality information feedback is reduced by reporting quality measures for a number M out of all transmission bands having the best quality.

SUMMARY

A method and apparatus for feedback overhead reduction in wireless communications are disclosed. Averaging, compression, or both are used to reduce a number of bits, or overhead, needed for transmission of channel quality information. The method disclosed here requires fewer transmitted bits than some previously proposed "best-M" schemes.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
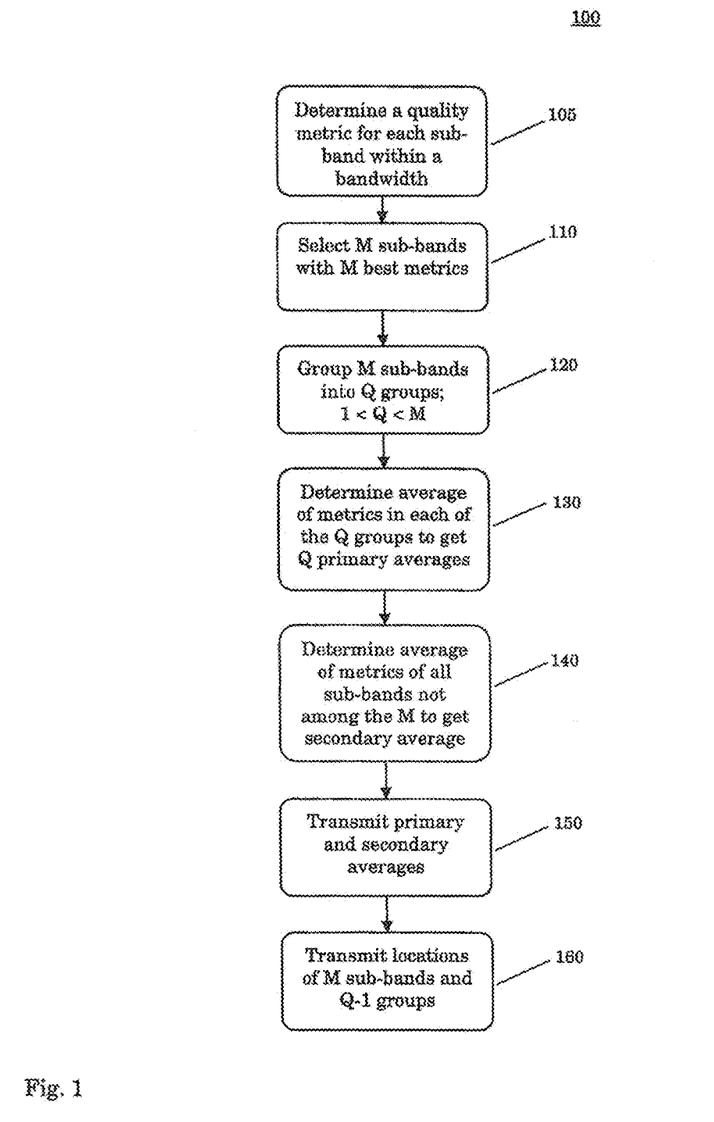
FIG. 1 is a flowchart of a first embodiment of a method for overhead reduction.

FIG. 1 is a flowchart showing a first embodiment of a method 100 for reducing feedback transmission overhead in wireless communications, which shall be designated a regular hybrid best-M scheme. As is known to those skilled in the art, a bandwidth of a communication channel is typically divided into a number of sub-bands. The method 100 begins with determining a quality of a signal in each sub-band 105. The measure of quality is a pre-defined quality metric, such as a signal-to-noise ratio or a channel quality index (CQI). A number M of sub-bands having the best values of the metric are selected 110. The number M is less than the total number of sub-bands.

The M selected sub-bands are preferably grouped into a number Q of groups in step 120. The number of groups Q is preferably at least 2 and less than the selected number of sub-bands M. As Q decreases, the number of bits (overhead) needed to report the quality metrics decreases, but the accuracy (resolution) of reporting which bands are in the best M also decreases. The value of Q is therefore preferably chosen to optimize this trade-off. An example optimization is to choose Q such that no more than one group contains exactly one sub-band. Once the sub-bands are grouped, an average of the metrics of the sub-bands in each of the Q groups is determined in step 130. The result is Q primary averages. A single average of metrics of the sub-bands not included in the M best sub-bands is determined (step 140). This average is designated as a secondary average. The Q primary averages and one secondary average are transmitted in step 150. Locations of the M best sub-bands and the Q groups within the bandwidth are transmitted (step 160).

In a specific example, the averages and locations are transmitted from a wireless transmit/receive unit (WTRU) to a base station (BS) enabling the BS to optimize communications by using only higher quality sub-bands. More generally, the averages may be transmitted to any wireless receiver.

Several alternatives may be used to transmit the locations in order to make the receiver aware of which sub-bands are included in the best M and which of those belong to each of the Q groups. In one alternative the averages may be transmitted in a pre-determined order, as described further below. In another alternative a set of labels may be transmitted. As an example of the latter, consider the case Q=2. One label may be transmitted to indicate locations within the bandwidth of the M best quality sub-bands. A second label may be transmitted indicating which of the M sub-bands belong to one of the two groups. By default, the remaining bands are known to belong to the other group. In general, in this scheme, Q locations are transmitted. Since Q is less than M, the number of bits (overhead) used to transmit useful sub-band quality information may be less than that required if quality information for all M bands is transmitted—the so-called best M individual reporting scheme. An alternative scheme within the first embodiment, designated hybrid best-M differential, may further reduce the required overhead. In this alternative, as in the hybrid best M scheme described above, Q location indices are transmitted, one for the best-M sub-bands and Q−1 for the bands in Q−1 of the Q groups. In this scheme, however, the Q groups are ordered, and only one primary average quality metric value for a first of the Q groups is reported. The remaining Q−1 primary averages are each reported as a difference between each average and the average preceding it in the order. The secondary average is reported as the difference between the secondary average and the last of the primary averages.

As an example of the differential scheme consider again the case Q=2. In this case, averages transmitted are:
a) one primary average for a first of the two groups,
b) the difference between the primary average of the second group and that of the first group, and
c) the difference between the secondary average and the primary average of the second group.

Compared with the regular hybrid best-M scheme, described above, items a) and b) together save at least two more bits and item c) saves at least one more bit.

Figure 2:
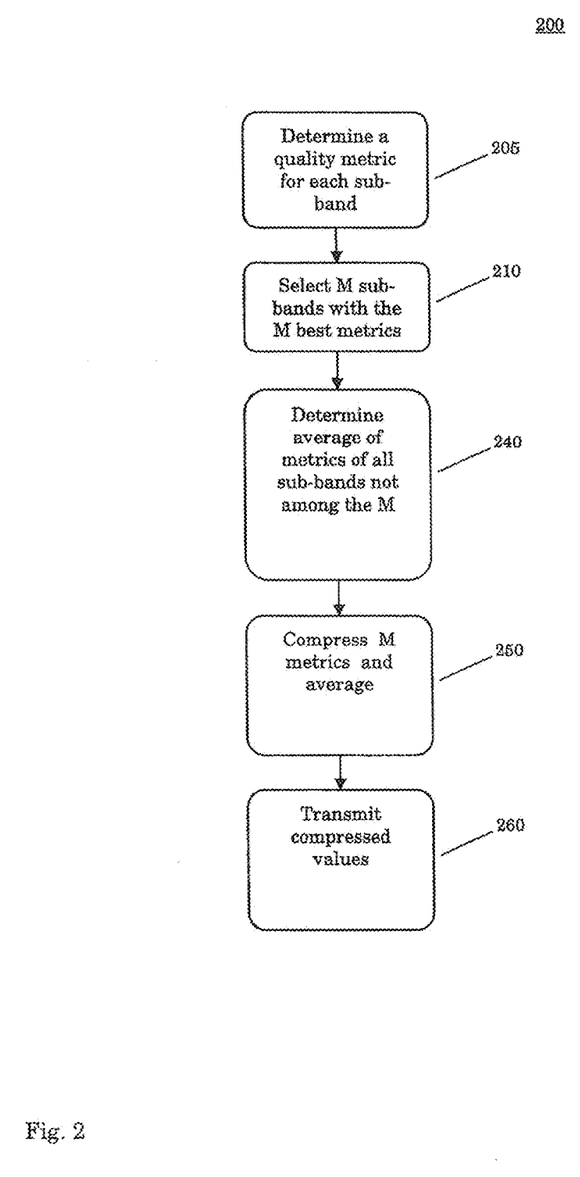
FIG. 2 is a flowchart of a second embodiment of a method for overhead reduction.

FIG. 2 is a flowchart showing a second embodiment of a method 200 for reducing feedback transmission overhead. In this embodiment a compression transform is used to reduce the overhead.

Similar to the first embodiment of FIG. 1, a quality metric is determined for each sub-band in step 205 and the M sub-bands with the best quality metric are selected in step 210. An average of the metrics for the sub-bands not among the best M is determined (step 240). The M metrics and the average are compressed in step 250 and the compressed values are transmitted (step 260). The compression reduces the required transmission overhead.

A particular example of the use of a compression transform is now described. The M metric values and the average may be arranged as components of a vector. The order of the components of the vector indicates which of the best M sub-bands corresponds to metric value and which component is the average. For example, for M=5 an eight-component vector y may be defined as $$y = [CQI_1 CQI_2 CQI_3 CQI_4 CQI_5 CQI_{avg} 0 0]$$

where $CQI_1$-$CQI_5$ are the quality metric values for sub-bands 1-5 respectively, and $CQI_{avg}$ is the average of the metrics for sub-bands not included in the M best. The two 0 components are explained below.

The information contained in the vector y is now compressed by a compression transform represented by matrix W. The compression may be represented as matrix multiplication to produce a compressed vector y3:

$$y3 = yW.$$

The components of the compressed vector y3 are quantized and transmitted.

As a specific example, the compression transform may be a Haar transform. Haar transforms, which are particular types of wavelet transforms, have been used for such applications as image compression. A Haar transform may reduce transmission overhead by shifting weight of the vector components into one component.

For the example of the M=5 vector above, a suitable Haar transform may be carried out with the matrix $$W = \begin{bmatrix} 1/8 & 1/8 & 1/4 & 0 & 1/2 & 0 & 0 & 0 \\ 1/8 & 1/8 & 1/4 & 0 & -1/2 & 0 & 0 & 0 \\ 1/8 & 1/8 & -1/4 & 0 & 0 & 1/2 & 0 & 0 \\ 1/8 & 1/8 & -1/4 & 0 & 0 & -1/2 & 0 & 0 \\ 1/8 & -1/8 & 0 & 1/4 & 0 & 0 & 1/2 & 0 \\ 1/8 & -1/8 & 0 & 1/4 & 0 & 0 & -1/2 & 0 \\ 1/8 & -1/8 & 0 & -1/4 & 0 & 0 & 0 & 1/2 \\ 1/8 & -1/8 & 0 & -1/4 & 0 & 0 & 0 & 1/2 \end{bmatrix}.$$

This Haar transform is invertible and the uncompressed vector y may be recovered without loss by inverting the process, as represented by $y = y_3 F$, where $$F = W^{-1} = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 0 & 0 & 0 & 0 \\ 0 & 0 & 0 & 0 & 1 & 1 & -1 & -1 \\ 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \end{bmatrix}.$$

Note that for this example, the two zeros in the vector y result in the last component of the compressed vector y3 being zero. This last component can therefore be removed before transmitting without loss of information.

As an alternative, the components of vector y may rearranged as follows:

$$y' = [CQI_1 CQI_2 CQI_3 CQI_4 CQI_5 0 CQI_{avg} 0].$$

After the compression, the last two components of the transformed vector may be removed without loss of information, as the receiver knows in advance which elements of y' are zero and it uses that prior knowledge to decode $CQI_5$ and $CQI_{avg}$ with no loss.

Figure 4:
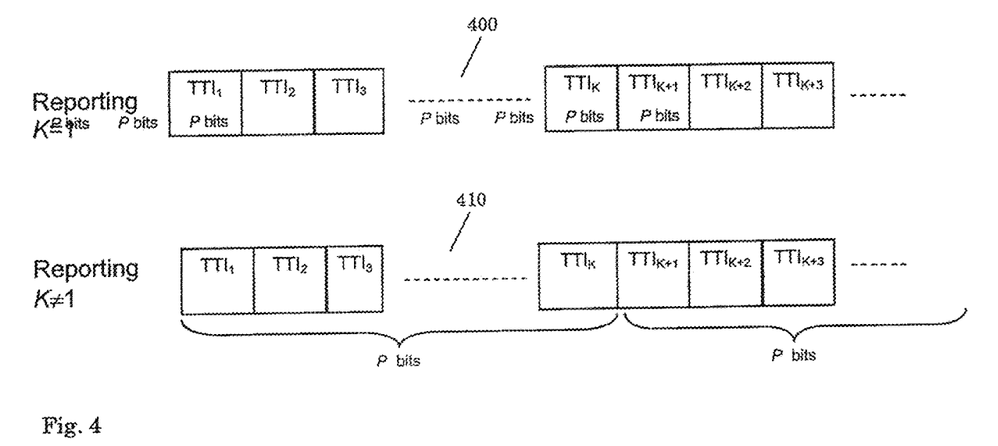
FIG. 4 shows an alternative example of the second embodiment.

In an alternative, additional overhead reduction may be achieved by spreading the transmission of compressed metrics and averages over more than one transmission time interval (TTI). This alternative is illustrated in FIG. 4. Suppose compression results in quality information being contained in P bits. Without spreading, P bits are transmitted in each TTI, 400. With spreading, the P bits are divided among K TTIs, 410, where K is greater than 1. The average bit overhead will then be P/K instead of P.

This embodiment may be extended for multi-layer, multi-code communication. In this scenario, quality metrics are reported for each layer for each sub-band. The quality metric values are contained in a matrix rather than a vector. The elements of the matrix may be the metric values themselves or difference values between each metric value and, for example, a maximum metric value. The information is then compressed by applying a two-dimensional compression transform, such a 2-D Haar transform. The result may be a matrix containing one relatively large element with the remaining elements having low values. This may then result in a significant reduction in feedback overhead when the compressed matrix is transmitted.

This embodiment may be applied to frequency partitioning. In this scenario, a transmission band is divided into sub-blocks. A quality metric is determined for each sub-block. The transmission band is divided into K partitions where K is at least 2. A first partition contains N1 best quality sub-blocks, a second partition contains the next best N2 sub-blocks which are not contained in the first partition, and so on through K partitions. For the first partition, the M1 sub-blocks out of N1 with the best M1 quality metrics are selected and the previously described Haar best M1 embodiment is applied. For the second partition the best M2 sub-blocks are selected where M2 may not equal M1, and Haar best M2 embodiment is applied. In similar manner, Haar compression is applied to each of the K partitions. This technique reduces transmission overhead to $$\left\lceil \log_2\binom{N_1-1}{M_1-1} + \log_2\binom{N_2-1}{M_2-1} + \ldots + \log_2\binom{N_k-1}{M_k-1} \right\rceil.$$

Figure 3:
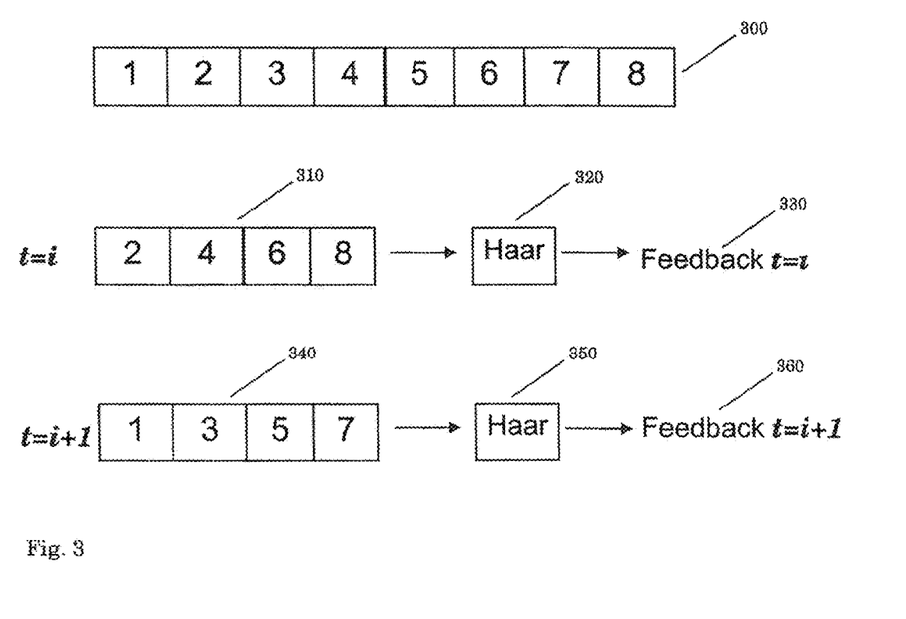
FIG. 3 is an example of a third embodiment of a method for overhead reduction.

Similar partitioning may be employed in multiple input/multiple output (MIMO) communication schemes. For example, partitioning may be done over codewords, layers, or both.

results are transmitted 330. In the next reporting interval i+1 Haar best-M compression is applied to the odd group 350 and the results are transmitted 360.

Table 1 shows a comparison of various overhead reduction schemes including some embodiments disclosed here, assuming each uncompressed quality metric is represented as five bits. In particular, percentage reduction in overhead for Haar Best-M Individual is shown as compared to Best-M individual without Haar compression.

TABLE 1

Overhead comparison of CQI compression schemes

| | | $N_{sb} = 25$ | | |
|---|---|---|---|---|
| Scheme | Signalling Cost (bits) | M = 4 | M = 5 | M = 7 |
| Full Feedback | $5 \times N_{sb}$ | 125 bits | 125 bits | 125 bits |
| Best-M Average | $5 + \left\lceil \log_2\binom{N_{sb}}{M} \right\rceil + 5$ | 24 bits | 26 bits | 29 bits |
| Best-M Individual | $5 \times M + \left\lceil \log_2\binom{N_{sb}}{M} \right\rceil + 5$ | 39 bits | 46 bits | 59 bits |
| Haar Best-M Individual | $N_{Haar} + \left\lceil \log_2\binom{N_{sb}}{M} \right\rceil$ | 29 bits (~ %25) | 34 bits (~ %25) | 40 bits (~ %32) |
| Best-M DM | $2 \times M + 5 + \left\lceil \log_2\binom{N_{sb}}{M} \right\rceil + 5$ | 32 bits | 36 bits | 43 bits |
| DCT Significant-M | $5 \times M + \left\lceil \log_2\binom{N_{sb}-1}{M-1} \right\rceil$ | 31 bits | 39 bits | 53 bits |
| DCT Partitioning | $5 \times (N_1 + N_2) + \left\lceil \log_2\binom{N_{sb}}{M} + \log_2\binom{M-1}{N_1-1} + \log_2\binom{N_{sb}-M-1}{N_2-1} \right\rceil$ | $N_1 = 3, N_2 = 1$ 34 bits | $N_1 = 4, N_2 = 1$ 43 bits | $N_1 = 6, N_2 = 1$ 57 bits |

FIG. 3 illustrates an example of a third embodiment of a method for reducing feedback transmission overhead. In this embodiment, compression can be distributed over different time intervals. Communication resources, such as allocated frequencies and time intervals, are collected into resource blocks which are in turn organized into resource block groups (RBGs). A quality metric for each RBG is determined. The RBGs are divided into N groups. Locations of the groups are known in advance to both a WTRU and a BS. In a first reporting time interval (e.g. a transmission time interval TTI) a compression transform, such as a Haar best M transform as previously described, may be applied to the quality metrics in one of the groups and the compressed metrics transmitted. In each subsequent reporting time interval the compressed metrics for another of the N groups are reported until quality metrics for an entire frequency band are reported. In this embodiment overhead is reduced at least because the vector of metric values is reduced from $N_{RBG}$ components to $N_{RBG}/N$.

Figure 5:
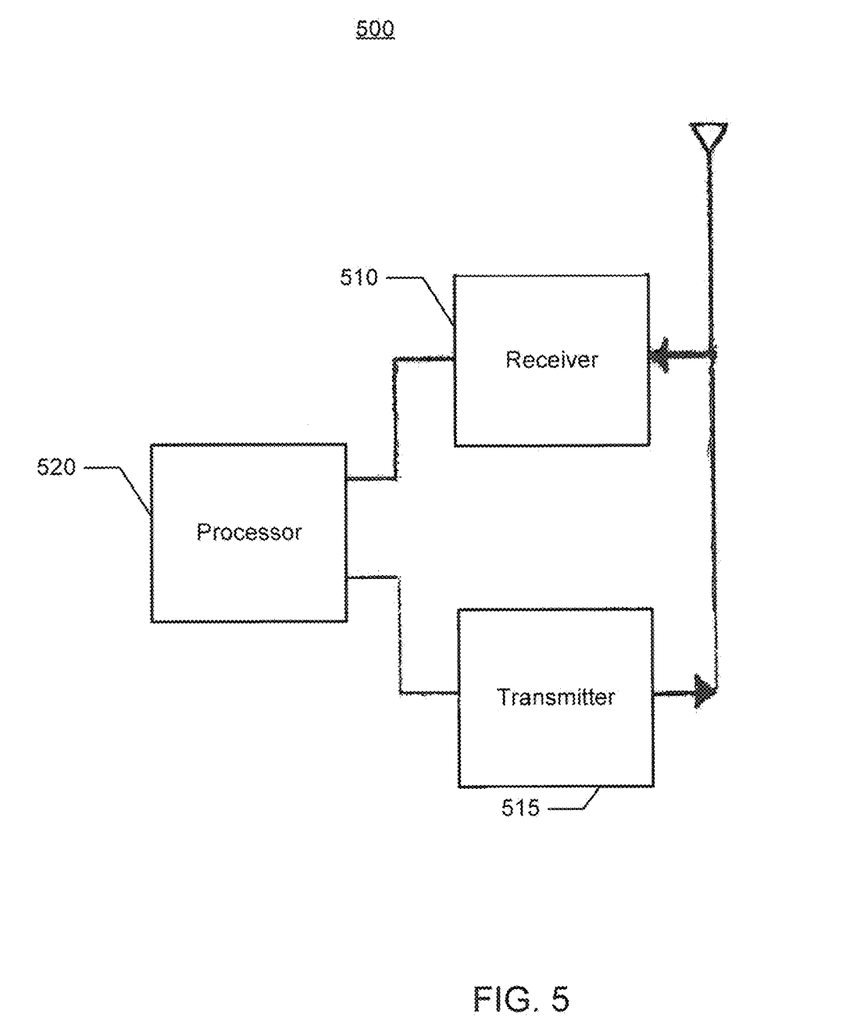
FIG. 5 shows an example of a wireless transmit/receive unit configured for implementing any of the embodiments of the method.

FIG. 3 illustrates a specific example of this embodiment in which N=2. A set of RBG's 300 is divided into N=2 groups, one containing even-numbered RBGs 310, the other containing odd-numbered RBGs 340. In reporting interval i, Haar best-M compression is applied to the even group 320 and the The embodiments described herein may be implemented, for example, in a wireless transmit/receive unit (WTRU) such as shown in FIG. 5. The WTRU may use the method to transmit channel quality information to a base station, which in turn may use the information to select the best quality channels to use for communicating with the WTRU. WTRU 500 may contain a receiver 510, a transmitter 515, and a processor 520. Receiver 510 may receive signals over various channels. Processor 520 may use the received information to determine quality metrics, organize the metrics into groups, average the metrics and compress the metrics. Transmitter 515 may transmit the averaged and/or compressed metrics with overhead reduced using the disclosed method.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
a processor configured to determine a first channel quality metric for a first transmission layer of each of N groups of sub-bands of a downlink bandwidth and a second channel quality metric for a second transmission layer of each of the N groups of sub-bands of the downlink bandwidth, wherein N is a positive integer greater than 1 and each group comprises a plurality of sub-bands of the downlink bandwidth; and
wherein the processor is configured to transmit each of the N pairs of first and second channel quality metrics in a different reporting transmission time interval (TTI).

2. The WTRU of claim 1 wherein the reporting TTI and the sub-band group to be reported in that reporting TTI are known in advance of the transmission by the WTRU and a wireless network.

3. The WTRU of claim 1 wherein the transmission in each of the reporting transmission time intervals does not include an index of a position of the group within the downlink bandwidth.

4. A method comprising:
determining, by a wireless transmit/receive unit (WTRU), a first channel quality metric for a first transmission layer of each of N groups of sub-bands of a downlink bandwidth and a second channel quality metric for a second transmission layer of each of the N groups of sub-bands of the downlink bandwidth, wherein N is a positive integer greater than 1 and each group comprises a plurality of sub-bands of the downlink bandwidth; and
transmitting, by the WTRU, each of the N pairs of first and second channel quality metrics in a different reporting transmission time interval (TTI).

5. The method of claim 4 wherein the reporting TTI and the sub-band group to be reported in that reporting TTI are known in advance of the transmission by the WTRU and a wireless network.

6. The method of claim 4 wherein the transmission in each of the reporting transmission time intervals does not include an index of a position of the group within the downlink bandwidth.

7. A wireless network node comprising:
a processor and a receiver configured to receive first and second channel quality index (CQI) metrics from a wireless transmit/receive unit (WTRU) in N reporting transmission time intervals (TTIs);
wherein the first CQI metric in each of the N reporting TTIs corresponds to a first transmission layer of a respective one of N groups of sub-bands of a downlink bandwidth and the second CQI metric in each of the N reporting TTIs corresponds to a second transmission layer of the respective one of the N groups of sub-bands of the downlink bandwidth.

8. The wireless network device of claim 7 wherein each reporting TTI and the sub-band group to be reported in that reporting TTI are known in advance of reception by the wireless network device.

9. The wireless network device of claim 7 wherein information received in the N reporting TTIs does not include an index of a position of the group within the downlink bandwidth.

10. The wireless network device of claim 7 wherein the processor is further configured to determine a CQI metric for all of the N groups from CQI information in each of the N reporting TTIs.

* * * * *